US011836981B2

(12) United States Patent
Pelletier et al.

(10) Patent No.: US 11,836,981 B2
(45) Date of Patent: Dec. 5, 2023

(54) METHOD FOR ASSISTING REAL-TIME MONITORING OF AT LEAST ONE PERSON ON SEQUENCES OF IMAGES

(71) Applicant: BULL SAS, Les Clayes-sous-bois (FR)

(72) Inventors: Benoît Pelletier, Saint Etienne de Crossey (FR); Edoh Kodjo, Grenoble (FR); Baptiste Metge, Grenoble (FR); Rémi Druilhe, Saint Martin d'Hares (FR); Cécile Boukamel-Donnou, Echirolles (FR); Nicolas Arnaise, Echirolles (FR)

(73) Assignee: BULL SAS, Les Clayes-sous-Bois (FR)

( * ) Notice: Subject to any disclaimer, the term of this patent is extended or adjusted under 35 U.S.C. 154(b) by 195 days.

(21) Appl. No.: 17/364,782

(22) Filed: Jun. 30, 2021

(65) Prior Publication Data
US 2022/0004768 A1    Jan. 6, 2022

(30) Foreign Application Priority Data

Jul. 6, 2020  (EP) ..................... 20305764

(51) Int. Cl.
*G06V 20/40* (2022.01)
*G06V 10/56* (2022.01)
*G06F 18/21* (2023.01)

(52) U.S. Cl.
CPC .......... *G06V 20/40* (2022.01); *G06F 18/2178* (2023.01); *G06V 10/56* (2022.01)

(58) Field of Classification Search
CPC ........ G06V 20/40; G06V 10/56; G06V 20/52; G06F 18/2178

(Continued)

(56) References Cited

U.S. PATENT DOCUMENTS

2016/0048741 A1   2/2016   Nguyen et al.
2017/0017833 A1   1/2017   Watanabe et al.
(Continued)

FOREIGN PATENT DOCUMENTS

EP   2490171 B1   11/2020
GB   2493580 A    2/2013

OTHER PUBLICATIONS

European Search Report issued in EP20305764 dated Dec. 11, 2020 (7 pages).

*Primary Examiner* — Ali Bayat
(74) *Attorney, Agent, or Firm* — ARC IP LAW, PC; Joseph J. Mayo (57) ABSTRACT

A method for monitoring a person of interest in video that may be generated by multiple cameras in different locations. A sequence of images along with data such as time and location, called a tracklet, may be generated for the person of interest. This reference tracklet may then be compared to other tracklets received at later times to determine if the person of interest appears in these other tracklets. Analyses may include locating persons in the video images, calculating person signatures, and comparing signatures to signatures of the person of interest. Analyses may also include filters for possible locations of the person of interest based on how quickly this person could move from one location to another, and filters based on color of the person of interest's clothing. Possible matches may be confirmed by an operator, while matches with high confidence may be automatically identified as the person of interest.

12 Claims, 3 Drawing Sheets

(58) Field of Classification Search
USPC .......................................................... 382/103
See application file for complete search history.

(56) References Cited

U.S. PATENT DOCUMENTS

| | | | | |
|---|---|---|---|---|
| 2018/0349704 | A1* | 12/2018 | Mehrseresht | ......... G06F 18/295 |
| 2018/0349710 | A1* | 12/2018 | Houri | ..................... G06V 20/53 |
| 2019/0080003 | A1* | 3/2019 | Alcantara | ............ G06V 40/103 |
| 2020/0082851 | A1* | 3/2020 | Chau | .................... G06V 40/161 |
| 2020/0279240 | A1* | 9/2020 | Glaser | .................... G06Q 20/20 |
| 2021/0127071 | A1* | 4/2021 | Rebien | .................... H04N 7/18 |
| 2022/0036568 | A1* | 2/2022 | Liu | ......................... G06T 7/248 |

* cited by examiner

METHOD FOR ASSISTING REAL-TIME MONITORING OF AT LEAST ONE PERSON ON SEQUENCES OF IMAGES

BACKGROUND

Field of the Invention

The field of the invention is the field of real-time video surveillance of persons, in particular within a space and based on video streams supplied by cameras distributed in said space. More particularly, but not by way of limitation, one or more embodiments of the invention relate to a method and a device for assisting real-time monitoring of a person on sequences of images and to a method and an installation for real-time monitoring of a person of interest by cameras.

Description of the Related Art

Solutions currently exist, using deep learning models, of the "human detector" type, allowing a person to be detected in an image in an automated manner. Further information can be found on this type of deep learning model on the page:
https://github.com/tensorflow/models/tree/master/research/object_detection.

Solutions also exist, using deep learning models, of the "human ReID" type, making it possible to determine a signature of a person in an image. Further information can be found on this type of deep learning model on page:
https://arxiv.org/abs/1807.09666

Finally, solutions are also known, using deep learning models, of the "human parsing" type, allowing visual attributes to be determined, in particular attributes relating to the colours of clothes worn by a person appearing in an image or in a sequence of images. Further information can be found on this type of deep learning model on the page:
https://arxiv.org/abs/1802.02611

Solutions exist for seeking the route of a person of interest, in the recent past, based on stored images, implementing one or more of the aforementioned deep learning models. However, no solution exists for real-time automated monitoring of a person based on real-time video streams supplied by a plurality of spatially distributed surveillance cameras.

But, the number of surveillance cameras is increasing faster than the number of human video surveillance operators, such that it becomes very difficult for human operators to monitor a person or a vehicle moving from one camera to another. If the operator is disturbed, he/she may lose the person and it may be particularly tricky to find them again. Tracking several persons or vehicles at once is even more difficult, or even impossible.

An aim of one or more embodiments of the invention is to overcome at least one of the aforementioned drawbacks.

Another aim of one or more embodiments of the invention is to propose a solution for real-time, automated monitoring of a person in sequences of images.

An aim of one or more embodiments of the invention is also to propose a solution making it possible to facilitate real-time monitoring of a person of interest, in sequences of images, by a human operator.

BRIEF SUMMARY OF THE INVENTION

One or more embodiments of the invention make it possible to achieve at least one of these aims by a method for assisting real-time monitoring, implemented by a computer, of a person of interest, based on at least one sequence of images of said person of interest, called reference tracklet, said method comprising at least one iteration of the following steps:
- obtaining, in real time, at least one new sequence of images (108), called new tracklet, relating to a person;
- analysing said new tracklet, comprising the following steps carried out for at least one reference tracklet:
  - calculating a distance between a signature of said reference tracklet and a signature of said new tracklet,
  - when said distance is less than or equal to at least one predetermined threshold, automated filtering of said new tracklet with at least one parameter associated with said reference tracklet, and
- when said new tracklet satisfies said analysis step, validating or not said tracklet as belonging to said person of interest.

Thus, for a reference tracklet in which a person of interest appears, one or more embodiments of the invention make it possible to identify, in an automated manner, any new tracklet later in time than said reference tracklet, in which said person of interest appears.

In fact, in one or more embodiments of the invention, the human operator gives as input one or more sequences of images in which a person of interest appears, whom the operator wishes to monitor in real time. From this moment, all the new tracklets obtained by all the cameras are monitored and analysed automatically. When a new tracklet comprises an identical person or one resembling said person of interest, it is automatically detected, and optionally validated. Consequently, one or more embodiments of the invention make it possible to carry out real-time monitoring, or tracking, of a person of interest in a manner that is simpler for the operators. The operator uses less effort for real-time monitoring of a person of interest on video streams that are supplied by several spatially distributed cameras, in particular when the cameras are numerous.

In one or more embodiments of the invention, by "tracklet" is meant a sequence of images on which a person appears, obtained based on a video stream supplied by a camera.

By "new tracklet" is meant a tracklet obtained based on a video captured, after the selection of the reference tracklet, in real time, i.e. at the moment when the method according to one or more embodiments of the invention is executed.

By "signature" of a tracklet is meant an item of numerical data, represented by numerical or alphanumerical characters, depending on the content of said tracklet, and supplied by a predetermined model.

Each tracklet is generated based on a video stream supplied by a camera. In particular, each new tracklet is generated based on a real-time video stream, for example an RTSP (real time streaming protocol) video stream, supplied by a camera, in particular a surveillance camera.

Generating the tracklet can be carried out locally to said camera, or on a remote site with which said camera is in wired or wireless communication. In this case, the real-time video stream is transmitted in real time to said remote site, which analyses said video stream and extracts therefrom one or more tracklets, by known techniques, which will be described below.

According to a characteristic that is in no way limitative, for a person of interest, at least one new reference tracklet can be added, deleted or amended by the operator at any time.

In other words, the list of reference tracklets taken into account in the method according to one or more embodiments of the invention, and in particular during the analysis step, can be updated at any time by the operator.

At least one reference tracklet can be supplied manually by the operator.

Alternatively, or in addition, at least one reference tracklet can be supplied by a prior search in a database storing tracklets, for example for a recent past.

Alternatively or in addition, at least one reference tracklet can be supplied by the method according to one or more embodiments of the invention, during a previous iteration of the method according to one or more embodiments of the invention, by storing a new tracklet as reference tracklet as described hereinafter.

At least one reference tracklet can be a tracklet obtained based on a video stream captured and supplied in real time by a camera from a plurality of spatially distributed cameras. Similarly, the or each new tracklet can be a tracklet generated based on a video stream captured and supplied in real time by one of said plurality of cameras.

In one or more embodiments of the invention, the filtering step can comprise a time-space filtering of the new tracklet as a function of:
  geographical positions of the camera or cameras having captured the video streams on the basis of which the reference tracklet and said new tracklet were obtained,
  the respective times at which said tracklets were obtained, and
  a predetermined maximum speed of movement of a person.

In other words, this filtering step makes it possible to determine if it is physically possible for the person of interest to be present in the new tracklet.

To this end, the time-space filtering step determines the distance between the position of the camera, called reference position, from which the reference tracklet was obtained, and the position of the camera from which the new tracklet was obtained. In addition, the period elapsed between the reference tracklet and the new tracklet is determined. Based on these items of distance and period data, a speed of movement is calculated and compared to the predetermined maximum speed of movement:
  if the calculated speed is greater than the maximum speed, then it is impossible for the person of interest to be present in the new tracklet: the new tracklet is eliminated;
  otherwise, it is possible for the person of interest to be present in the new tracklet: the new tracklet satisfies the time-space filtering.

Thus, this time-space filtering step makes it possible to reduce automatically the number of tracklets to be analysed, in the remainder of the process, and increases the monitoring efficiency by reducing the number of tracklets sent to the human operator.

In one or more embodiments of the invention, for at least one tracklet:
  the geographical position of the camera from which said tracklet was obtained, and/or
  the time at which the tracklet was obtained;
can be stored with said tracklet, for example at the moment of generating said tracklet.

In particular, the time at which the tracklet was obtained can correspond to the time of capture, by the camera, of the real-time video stream on the basis of which the tracklet was generated.

The filtering step can comprise a visual attribute filtering based on:
  at least one colour of an item of clothing of the person of interest present in the reference tracklet, and
  at least one colour of an item of clothing of the person of interest present in the new tracklet.

To this end, the visual attribute filtering step compares a colour of an item of clothing appearing in the new tracklet to a colour of an item of clothing of the person of interest present in the reference tracklet:
  if the colours do not correspond, then it is impossible for the person of interest to be present in the new tracklet: the new tracklet is eliminated;
  otherwise, it is possible for the person of interest to be present in the new tracklet: the new tracklet satisfies the visual attribute filtering.

In one or more embodiments of the invention, two colours correspond when the distance between these colours is less than a predetermined threshold, or when the similarity between these colours is greater than a threshold value.

The distance between two colours can for example be an offshade calculated according to known techniques.

In particular, before being compared, two colours can be passed through a colour space, such as for example through the CIELAB colour space (https://en.wikipedia.org/wiki/CIELAB_color_space). Then, an offshade, or distance, also called delta E, can be calculated according to known techniques, such as for example that described on the internet page https://en.wikipedia.org/wiki/Color_difference#CIEDE2000.

Thus, this step of filtering (a) visual attribute(s) makes it possible to reduce automatically the number of tracklets to be analysed, in the remainder of the process, and increases the monitoring efficiency on the basis of the colour of the items of clothing of the persons present in the tracklets.

In one or more embodiments of the invention, the visual attribute filtering step can compare a single colour of an item of clothing appearing in the new tracklet to a single colour of an item of clothing appearing in the reference tracklet.

Alternatively, the visual attributes filtering step can perform a clothing colour comparison for different parts of the body, for example:
  a colour comparison for the upper body, and/or
  a colour comparison for the lower body.

For at least one tracklet, the or each colour of an item of clothing of the person appearing in said tracklet can be determined by analysing at least one image of said tracklet, in particular by using a deep learning model, for example a model of the "human parsing" type.

For at least one tracklet, the or each colour of an item of clothing can be determined at the moment of generating the tracklet and stored with said tracklet.

According to an illustrative characteristic, the validation step can comprise a manual validation of the new tracklet, by a human operator, when said new tracklet satisfies the analysis step with a predetermined first confidence level.

In this case, the new tracklet is displayed on a screen, optionally at the same time as the reference tracklet, and the human operator carries out a visual inspection of the new tracklet, and in particular a visual comparison of the person present in the new tracklet with the person of interest present in the reference tracklet. If the operator concludes visually that the same person is concerned, the operator can validate the new tracklet. Otherwise, the new tracklet is not validated.

This makes it possible to avoid false positives or false negatives, by calling the human operator, for a new tracklet resembling the reference tracklet.

Alternatively, or in addition, the validation step can comprise an automatic validation of the new tracklet, when said new tracklet satisfies the analysis step with a predetermined second confidence level, higher than said first confidence level.

In this case, it is assumed that the person present in the new tracklet must necessarily be the person of interest, and the validation takes place without reference to the human operator. This makes it possible to reduce the workload of the human operator by carrying out the validation in their place.

Each confidence level can be defined with one or more threshold values, each relating to a value determined during the analysis step.

For example, the first confidence level can be defined with:
- a first threshold value relating to the calculated distance between the signature of the new tracklet and the signature of the reference tracklet; and
- at least one second threshold value relating to the calculated distance between the colours of items of clothing during the visual attributes filtering step.

In this case:
- if the distance between the reference signature and the signature of the new tracklet is less than or equal to the first threshold value; and
- if the, or each, distance obtained during each colour comparison during the visual attributes filtering step is less than or equal to the second threshold value;

then the new tracklet satisfies the filtering step with the first confidence level.

In this case, the new tracklet can be presented to the operator for optional manual validation.

Similarly, the second confidence level can be defined with:
- a third threshold value relating to the calculated distance between the signature of the new tracklet and the signature of the reference tracklet, less than the first threshold value; and
- at least one fourth threshold value relating to the calculated distance between the colours of items of clothing during the visual attributes filtering step, less than the second threshold value.

In this case:
- if the distance between the reference signature and the signature of the new tracklet is less than or equal to the third threshold value; and
- if the, or each, distance obtained during each colour comparison during the visual attributes filtering step is less than or equal to the fourth threshold value;

then the new tracklet satisfies the filtering step with the second confidence level.

In this case, the new tracklet can be validated automatically.

The method according to one or more embodiments of the invention can comprise storing a new tracklet in the case of validation of said new tracklet.

The new tracklet can be stored in a database, dedicated or not to monitoring the person of interest.

Otherwise, i.e. when the new tracklet is not validated, this then means that the new tracklet does not correspond to the person of interest. The new tracklet may not be stored, or may be stored in another database.

The method according to one or more embodiments of the invention can comprise storing a new tracklet, as a reference tracklet, in the case of manual validation of said new tracklet.

In this case, this new tracklet is considered as a reference tracklet for the next iterations of the method according to one or more embodiments of the invention.

The method according to one or more embodiments of the invention may further comprise, for at least one new tracklet, a step of generating said tracklet based on a real-time video stream supplied by a camera, said step comprising the following steps:
- converting said real-time video stream to a plurality of images;
- in each image:
  - detecting a person by using a deep learning model, for example a deep learning model of the "human detector" type, and
  - for each person detected, calculating a signature, by using a deep learning model, for example a deep learning model of the "human ReID" type; and
- extracting a sequence of images corresponding to one and the same person, as a function of said calculated signatures.

In particular, a tracklet is composed of images corresponding to the same person, i.e. images each containing a person having the same person signature, or similar person signatures.

Two person signatures are identical or similar when they have a distance, for example a cosine distance, less than or equal to a predetermined threshold.

According to an alternative, in order to avoid overloading the deep learning model used for the person detection, and to retain the real-time aspect, it is possible not to process each image obtained following the conversion step, by said deep learning model.

In this case, the deep learning person detection model is used to process an image every N images obtained in the conversion step. For the intermediate image or images between two calls to the deep learning person detection model, it is possible to use more rapid trackers of the KCF type:

(https://arxiv.org/abs/1404.7584), activated on each of the detections returned by said deep learning model used for person detection.

According to an embodiment that is in no way limitative, for at least one image, the signature of a person in this image is calculated as a function of the appearance of this person in said image. In particular, this signature is not constructed on biometric data, is not unique and becomes obsolete when the person changes his/her clothes.

Of course, according to an alternative, it is possible to calculate the signature of the person on the basis of biometric data. In this case, the signature obtained will not be dependent on the colour of clothing, for example.

Of course, the method according to one or more embodiments of the invention can comprise generating the reference tracklet in a similar or identical manner, based on a video stream comprising the person of reference.

The method according to one or more embodiments of the invention can comprise, for at least one new tracklet of a person, a step of determining the signature of said new tracklet as a function of the signatures calculated for this person on each of the images forming said new tracklet.

The signature of the tracklet can be obtained by any relationship taking into account these signatures. In particular, the signature of the new tracklet can be an average of all these signatures.

Of course, the method according to one or more embodiments of the invention can comprise determining the signature of the reference tracklet in a similar or identical manner.

The method according to one or more embodiments of the invention can comprise, for at least one new tracklet, a step of detecting at least one colour of an item of clothing of the person present in said new tracklet by using a deep learning model, for example a deep learning model of the "human parsing" type.

Of course, the method according to one or more embodiments of the invention can comprise a step of detecting at least one colour of an item of clothing of the person in the reference tracklet, in a similar or identical manner.

According to a particular embodiment, the distance determined between the signatures of two tracklets, and in particular between the signature of the reference tracklet and a new tracklet, can be the cosine distance.

In an equivalent manner, instead of using a distance, the method according to one or more embodiments of the invention can be implemented with a similarity such as for example cosine similarity.

Of course, it is possible to use other distances, such as for example Euclidean distance, a correlation distance, etc.

Of course, the method according to one or more embodiments of the invention can be used for assisting real-time, simultaneous monitoring of several persons of interest.

In this case, the method according to one or more embodiments of the invention is executed individually for each person of interest, in parallel.

Thus, it is possible to have several instances of the method according to one or more embodiments of the invention that are executed in parallel, each for one person of interest. To this end, a reference tracklet is selected and supplied to the method according to one or more embodiments of the invention for each person of interest, and the steps of the method according to one or more embodiments of the invention, in particular the analysis step, are carried out for each reference tracklet.

According to another aspect of one or more embodiments of the invention, there is proposed a computer program comprising instructions that when executed by a data processing appliance implement all the steps of the method for assisting real-time monitoring of at least one person of interest, according to one or more embodiments of the invention.

The computer program can be coded in any suitable programming language, for example in C, C++, Java, Python, etc.

According to another aspect of one or more embodiments of the invention, there is proposed a storage media readable by a data processing appliance, comprising instructions that when executed by said data processing appliance implement all the steps of the method for assisting real-time monitoring of at least one person of interest, according to one or more embodiments of the invention.

The storage media can be any type of media that can be read by a data processing device. For example, the storage media can be a USB key, a hard disk, a flash memory, a server, a CD-ROM, etc.

The instructions can be stored on the storage media in source code or in machine language.

According to another aspect of one or more embodiments of the invention, there is proposed a device for assisting real-time monitoring of at least one person of interest, comprising at least one processing unit configured to implement all the steps of the method for assisting real-time monitoring of at least one person of interest, according to one or more embodiments of the invention.

The device according to one or more embodiments of the invention can be a computer, a server, or any other computerized or data processing appliance, capable of executing computer instructions and processing images.

The device according to one or more embodiments of the invention can be a local device, or can be distributed, for example in the cloud.

The, or each, processing unit can be or comprise at least one processor, at least one calculator, at least one programmable computer chip, etc. In particular, the at least one processing unit can be formed by one or several processors, or several distributed computing resources.

The device according to one or more embodiments of the invention can comprise at least one display screen for displaying thereon at least one new tracklet, and optionally at least one reference tracklet, so that a human operator can carry out a visual inspection of said new tracklet, with a view to validating said new tracklet or not.

The device according to one or more embodiments of the invention can also comprise storage means of at least one tracklet.

In particular, the device according to one or more embodiments of the invention can comprise a database in which a new tracklet is stored when it is validated by the human operator as corresponding to the person of interest.

According to another aspect of one or more embodiments of the invention, there is proposed a method for real-time monitoring of at least one person of interest, by a plurality of spatially distributed cameras, said method comprising, for each person of interest, the following steps:
- capturing, by one of said cameras, a video stream in which said person of interest is present, and on the basis of which a tracklet of said person of interest is generated,
- capturing, by at least one of said cameras, at least one real-time video stream, on the basis of which at least one new tracklet is generated, later than the tracklet of said person of interest, and
- processing at least one of said new tracklets by the method for assisting real-time monitoring according to one or more embodiments of the invention, in which said tracklet of said person of interest is selected as reference tracklet.

According to another aspect of one or more embodiments of the invention, there is proposed an installation for real-time monitoring of at least one person of interest comprising:
- several spatially distributed cameras for capturing and supplying real-time video streams, and
- at least one data processing device;
configured to implement the method for real-time monitoring of at least one person of interest according to one or more embodiments of the invention.

The data processing device can be arranged on a site remote from the capture cameras.

The data processing device can be in wired or wireless communication with each of the cameras.

According to one or more embodiments of the invention, at least one camera can supply a real-time video stream in any format, for example a real-time video stream in RTSP format.

BRIEF DESCRIPTION OF THE DRAWINGS

Other advantages and characteristics will become apparent on examination of the detailed description of an embodiment that is in no way limitative, and from the attached drawings in which.

DETAILED DESCRIPTION OF THE INVENTION

It is well understood that the embodiments that will be described hereinafter are in no way limitative. It is possible in particular to envisage variants of the invention comprising only a selection of characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In the FIGURES, elements common to several figures retain the same reference.

Figure 1:
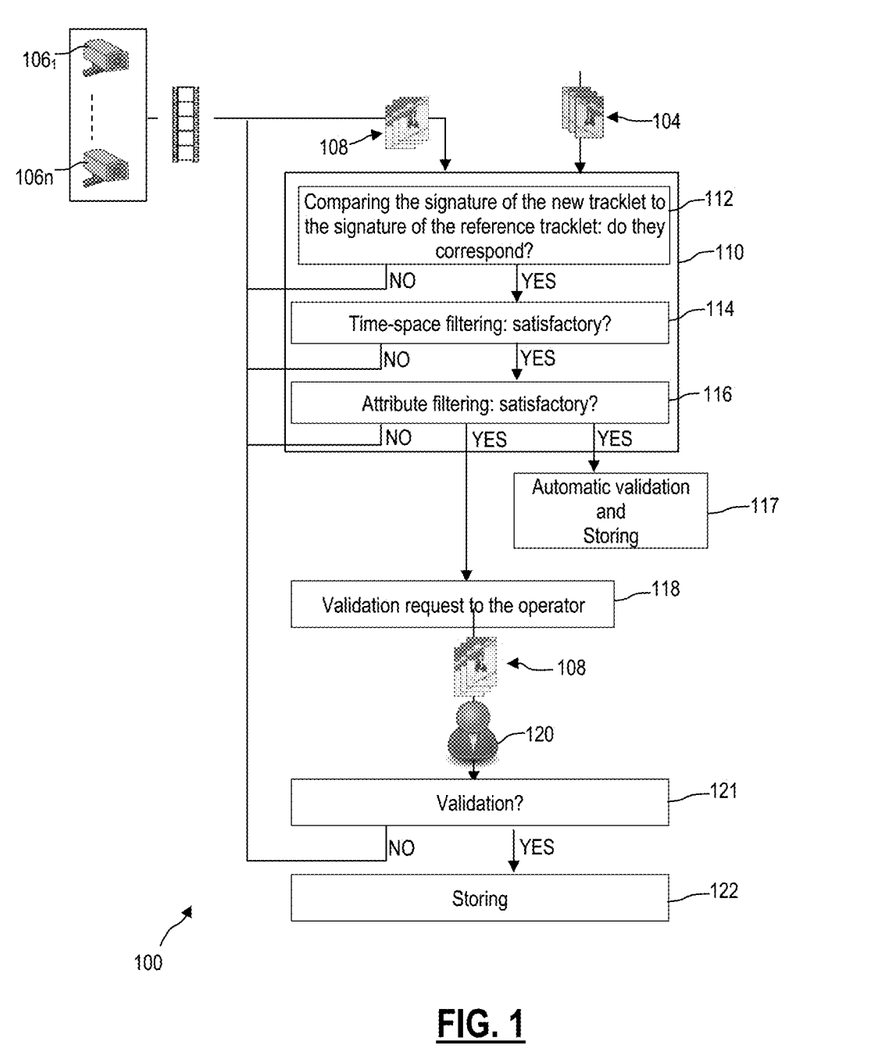
FIG. 1 is a diagrammatic representation of a non-limitative embodiment of a method for assisting real-time monitoring of at least one person of interest according to one or more embodiments of the invention.

FIG. 1 is a diagrammatic representation of a non-limitative embodiment of a method for assisting real-time monitoring of a person of interest.

The method 100, shown in FIG. 1, is carried out based on one or more reference tracklets 104 corresponding to the person of interest. For the sake of simplicity, in this example, only one reference tracklet 104 will be considered.

Of course, if there are several reference tracklets 104, the steps of the method are carried out for each reference tracklet 104 individually.

The reference tracklet 104 was generated based on a video stream captured by a camera, called reference camera hereinafter, from a plurality of spatially distributed cameras $106_1$-$106_n$. The reference tracklet 104 is formed by a sequence of images representing said person of interest, immobile or mobile, in the field of vision of the reference camera. An example of generating a tracklet based on a video stream will be described hereinafter.

The reference tracklet 104 is stored in a database in association with:
- a numerical signature of said reference tracklet;
- an item of GPS location data of the reference camera;
- an item of data indicating the time the reference tracklet 104 was taken, and in particular of the video stream on the basis of which the reference tracklet was generated, for example a start time corresponding to the time of the starting image of the tracklet and an end time corresponding to the time of the ending image forming the tracklet;
- one or more items of colour data indicating the colour of one or more items of clothing worn by the person of interest in the images forming the reference tracklet 104; and
- optionally, an item of data relating to the position of the person of interest in the video taken by the reference camera.

In addition, the reference tracklet 104 is stored with a numerical signature of said tracklet. An example of determining a numerical signature will be described below.

From the moment when the reference tracklet 104 was selected, each new tracklet 108 obtained in real time based on the video streams supplied by any one of the capture cameras $106_1$-$106_n$ is analysed, in real time, by the method according to one or more embodiments of the invention during an analysis step 110.

Just like the reference tracklet 104, each new tracklet 108 is associated with:
- a numerical signature of said new tracklet 108;
- an item of GPS location data of the camera $106_i$ having supplied the video stream in real time on the basis of which the new tracklet 108 was generated;
- an item of data indicating the time the new tracklet 108 was taken, and in particular of the real-time video stream on the basis of which the new tracklet 108 was generated, for example a start time corresponding to the time of the starting image of the new tracklet and an end time corresponding to the time of the ending image forming the new tracklet;
- one or more items of colour data indicating the colour of one or more items of clothing worn by the person present in the images forming the new tracklet 108; and
- optionally, an item of data relating to the position of the person of interest in the video taken by the reference camera.

The new tracklet 108 and the reference tracklet 104 are given as input to an analysis step 110 of the method 100.

This analysis step 110 is carried out individually for each new tracklet 108 generated based on the real-time video stream supplied by each of the capture cameras $106_1$-$106_n$.

The analysis step 110 comprises a step 112 of comparing the respective signatures of the reference tracklet 104 and the new tracklet 108. To this end, this step 112 calculates the cosine distance between said signatures.

If the distance is greater than a predetermined first threshold, then the two signatures do not correspond. In this case, the analysis step 110 is terminated and a new tracklet can be analysed.

If the distance is less than a predetermined first threshold, then it is assumed that there is a sufficient probability that the new tracklet 108 corresponds to the person of interest, with a first confidence level.

If the distance is less than the predetermined second threshold, lower than the predetermined first threshold, then it is assumed that there is a sufficient probability that the new tracklet 108 corresponds to the person of interest, with a second confidence level, higher than the first confidence level.

The analysis step 110 comprises a step 114 of time-space filtering. During this time-space filtering step 114, it is determined if the person of interest has had the time to move from the site where the reference tracklet 104 was taken to the site where the new tracklet 108 was taken, in the period separating said tracklets.

To this end, the distance separating the place where the reference tracklet 104 was taken from the place where the new tracklet 108 was taken is calculated as a function of the GPS data associated with said tracklets. In addition, the period separating the time when the reference tracklet 104 was taken from the time when the new tracklet 108 was taken is calculated as a function of the time data associated with said tracklets.

A speed of movement is calculated as a function of said calculated distance and of said calculated period. The speed thus calculated is compared to a predetermined maximum speed.

If the calculated speed is greater than the maximum speed, this indicates that the new tracklet 108 cannot correspond to the person of interest, as the latter has not had the time to move to the place where the new tracklet 108 was taken. In this case, the analysis step 110 is terminated and a new tracklet can be analysed.

Otherwise, it is assumed that there is a sufficient probability that the new tracklet 108 corresponds to the person of interest.

The analysis step 110 also comprises a step 116 of filtering by attribute. During this attribute filtering step 116, it is determined if the person of the new tracklet 108 has the same attributes as the person of interest of the reference tracklet 104.

To this end, at least one visual attribute of the person of the new tracklet 108 is compared to at least one visual attribute of the person of interest of the reference tracklet 104.

In particular, in this example, step 116 compares:
the colour of the clothing of the upper body of the person of interest of the reference tracklet 104 to the colour of the clothing of the upper body of the person of the new tracklet 108, and
the colour of the clothing of the lower body of the person of interest of the reference tracklet 104 to the colour of the clothing of the lower body of the person of the new tracklet 108.

Two colours are compared to one another by calculating the distance, for example the colorimetric distance, between the data representing these two colours.

If the colorimetric distance is greater than a predetermined first threshold of colorimetric distance, then the two tracklets do not correspond. In this case, the analysis step 110 is terminated and a new tracklet can be analysed.

If the colorimetric distance is less than the predetermined first threshold of colorimetric distance, then it is assumed that there is a sufficient probability that the new tracklet 108 corresponds to the person of interest, with the first confidence level.

If the colorimetric distance is less than a predetermined second threshold of colorimetric distance, lower than the predetermined first threshold of colorimetric distance, then it is assumed that there is a sufficient probability that the new tracklet 108 corresponds to the person of interest, with the second confidence level.

When the new tracklet 108 satisfies all of steps 112-116, with the second confidence level, higher than the first confidence level, then the method 100 comprises a step 117 of automatic validation of the new tracklet 108 as corresponding to the person of interest and storing the new tracklet 108 in association with the person of interest.

When the new tracklet 108 satisfies all of steps 112-116, with the first confidence level, lower than the second confidence level, then the method 100 carries out a manual validation, or not, of the new tracklet.

To this end, the method 100 comprises a step 118 of requesting a validation from a human operator 120. During this step 118, the new tracklet 108 is displayed on a display screen, optionally with the reference tracklet 104, so that the human operator 120 can analyse the new tracklet 108 visually, or else compare the new tracklet 108 to the reference tracklet 104.

If during a step 121, the human operator 120 does not confirm that the new tracklet 108 corresponds to the person of interest, then the new tracklet 108 is disregarded. The analysis step 100 can be carried out for a new tracklet.

Otherwise, i.e. if during step 121, the human operator 120 confirms that the new tracklet 108 corresponds to the person of interest, then the new tracklet 108 can be stored during a step 112, as reference tracklet. This new tracklet 108 will be used as reference tracklet for the new iterations of the method according to one or more embodiments of the invention, instead of, or in addition to, the reference tracklet 104.

Of course, the invention is not limited to the example given in FIG. 1.

For example steps 112-116 can be carried out in another order than that described here, or only a part of these steps may be carried out.

In addition, the method according to one or more embodiments of the invention can comprise other steps than those described, such as a step of determining in real time the route of the person of interest as a function of the GPS positions associated with each new tracklet detected as corresponding to the person of interest.

Figure 2:
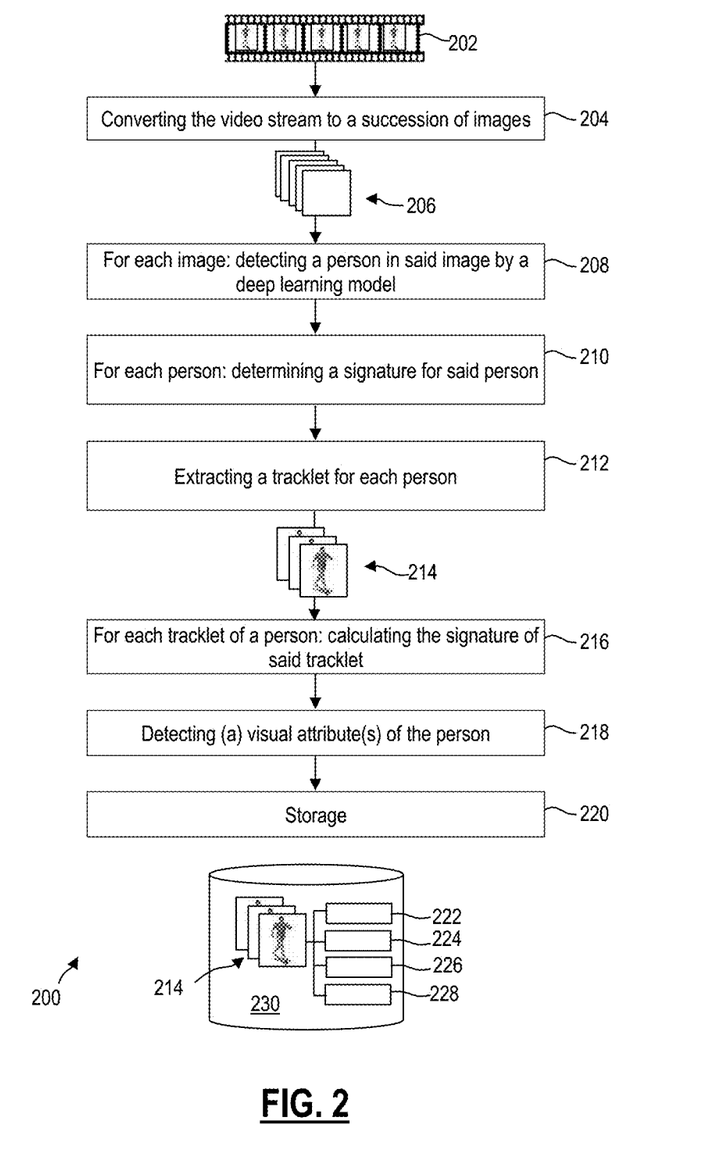
FIG. 2 is a diagrammatic representation of a step of generating a tracklet based on a video stream, capable of being implemented in one or more embodiments of the invention.

FIG. 2 is a diagrammatic representation of a step of generating a tracklet based on a video stream, capable of being implemented in one or more embodiments of the invention.

Step 200, shown in FIG. 2, makes it possible to generate a tracklet, i.e. a sequence of images comprising a person, based on a video stream 202 that can be a real-time video stream, such as for example an RTSP video stream.

Step 200 can be used to generate a tracklet in real time, or on the fly, i.e. as soon as a video stream is received, or continuously, or else as and when a video stream is received, for example from a surveillance camera.

During a step 204, the video stream 202 is converted to a succession of images 206. This conversion step 204 can be carried out by any known technique, in the knowledge that a video stream is per se a succession of images.

Then, during a step 208, each image 206 obtained from step 204 is processed to detect one or more persons therein, using a deep learning model. For example, detecting a person in an image can be carried out by using the "human detector" model. In step 208, an image that does not comprise any person is eliminated. When a person is detected in an image, the latter is retained.

During a step 210, a numerical signature is calculated for each person detected in an image 206, and the same for all the images 206 containing at least one person. Thus, when an image 206 comprises two persons, two signatures are determined for this image; one for each person. The signature of a person can be determined by using a deep learning model. For example, the signature of a person in an image 206 can be determined by using the "human ReID" model.

Then, during a step 212, all the images containing the same person signature, or similar person signatures, are extracted to form a tracklet for that person. It will be recalled that two person signatures are identical or similar when the distance between these two signatures, for example the cosine distance, is less than or equal to a predetermined value. Thus, in step 212, it is possible to have a single tracklet when the video stream shows only a single person, and several tracklets each corresponding to one person when the video stream shows several persons. It will be considered hereinafter that the video stream shows only a single person and that a single tracklet 214 is obtained in step 212.

During a step 216, a signature is determined for the tracklet 214 corresponding to a person, as a function of the signature of this person in each of the images constituting said tracklet 214. The signature of the tracklet can be determined by calculating an average of all the signatures of the person for the set of images constituting the tracklet, or by any other relationship taking into account these signatures.

During a step 218, for a tracklet of a person, at least one visual attribute of the person is detected. Such an attribute can be for example a colour of an item of upper-body clothing, a colour of an item of lower-body clothing, a colour of an object carried by the person, a type of clothing, etc. or any other visual attribute. Detecting at least one visual attribute can be carried out by using a deep learning model. For example, detecting at least one visual attribute can be carried out by using the "human parsing" model. In this case, each visual attribute is represented by a signature supplied by the model used. In the case where the attribute is a colour, the latter is represented by an item of numerical data in the RGB colour space.

Optionally, during a step 220, the tracklet 214, its signature 222, the at least one visual attribute 224, as well as an item of time data 226 representing the time the video stream 202 was taken, and an item of GPS data 228 representing the location of the camera having acquired the video stream 202 are stored in a database 230.

For example, the time and GPS data can be extracted from the video stream 202 for example, or supplied in association with said video stream 202.

Step 200 of generating a tracklet can be used to generate the reference tracklet 104, or each new tracklet 108 in FIG. 1. In particular, step 200 of generating a tracklet can be used to generate tracklets in real time and on the fly, based on captured video streams and supplied in real time by one or more cameras.

Figure 3:
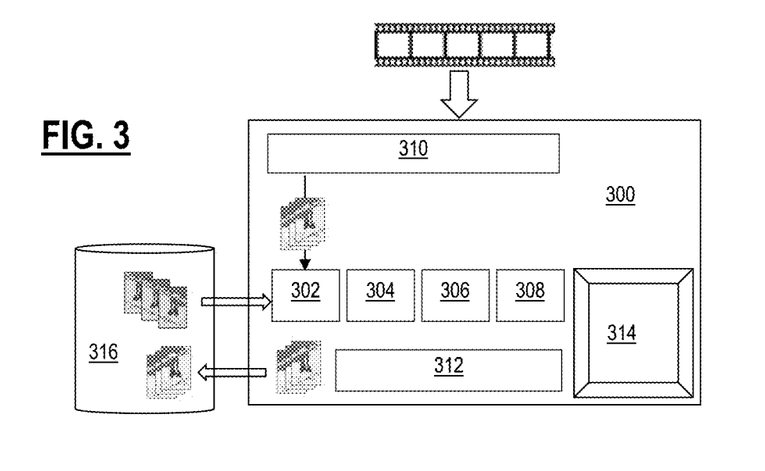
FIG. 3 is a diagrammatic representation of a non-limitative embodiment of a device for assisting real-time monitoring of at least one person of interest according to one or more embodiments of the invention.

FIG. 3 is a diagrammatic representation of a non-limitative embodiment of a device for assisting real-time monitoring of a person of interest according to one or more embodiments of the invention.

The device 300 in FIG. 3 can be used to implement the method 100 in FIG. 1, and more generally a method for assisting real-time monitoring of a person of interest according to one or more embodiments of the invention.

The device 300 comprises one or more data processing units configured to implement all the steps of the method according to one or more embodiments of the invention.

In particular, the device 300 comprises a processing unit 302 making it possible to select or to update a reference tracklet, or a list of reference tracklets, for example from a database or based on a new tracklet validated by a human operator.

The device 300 also comprises a processing unit 304 configured to calculate a distance, in particular the cosine distance, between the signatures of two tracklets given at input to said processing unit 304, and in particular the distance between the signature of the reference tracklet and the signature of a new tracklet.

The device 300 also comprises a processing unit 306 configured to carry out a time-space filtering of a tracklet, in particular of a new tracklet as a function of data relating to the reference tracklet, as described above.

The device 300 also comprises a processing unit 308 configured to carry out an attribute filtering of a tracklet, in particular of a new tracklet as a function of at least one attribute of the reference tracklet, as described above.

Optionally, the device 300 can also comprise a processing unit 310 making it possible to generate at least one tracklet based on a video stream, as well as parameters relating to said tracklet, such as for example the signature of said tracklet, an item of time data, an item of GPS data, at least one item of visual attribute data, etc. Non-limitatively, this processing unit 310 can in particular be configured to implement step 200 described with reference to FIG. 2.

Optionally, the device 300 can also comprise a processing unit 312 making it possible to store a new tracklet in a database when it is validated by the operator.

The device 300 also comprises a display screen 314 for displaying a tracklet for a visual inspection of said tracklet by a human operator, and a data input means for a human operator making it possible to confirm or not that a new tracklet corresponds to a reference tracklet. Such an input means can be a touch interface integrated in the display screen, a keyboard, a mouse, etc.

Each of the data processing units 302-310 can be individual and independent of the other processing units.

At least two of the data processing units 302-310 can be integrated within one and the same processing unit.

At least one processing unit can be a calculator, a processor, a programmable chip, etc.

Of course, the device 300 can comprise elements other than those described. For example, the device 300 can comprise a database 316, integrated or not in the data processing device 300, for storing at least one tracklet.

Figure 4:
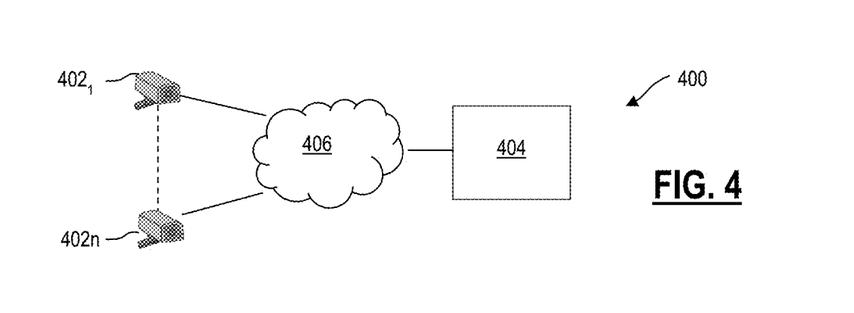
FIG. 4 is a diagrammatic representation of a non-limitative embodiment of an installation for real-time monitoring of at least one person of interest according to one or more embodiments of the invention.

FIG. 4 is a diagrammatic representation of a non-limitative embodiment of an installation for real-time monitoring of a person of interest.

The installation 400, shown in FIG. 4, comprises a plurality of cameras $402_1$-$402_n$, such as video surveillance cameras. For example, the cameras $402_1$-$402_n$ can be the cameras $106_1$-$106_n$ in FIG. 1.

The installation 400 also comprises a data processing device 404, in communication with the cameras $106_1$-$106_n$, in order to receive, in real time, video streams captured by said cameras $106_1$-$106_n$ and process them. More specifically, the data processing device 404 can be configured to extract one or more new tracklets from the video streams supplied by the cameras $402_1$-$402_n$ and implement the method for assisting real-time monitoring according to one or more embodiments of the invention and in particular the method 100 in FIG. 1.

For example, the data processing device 404 can be the device 300 in FIG. 3.

The cameras $402_1$-$402_n$ can be in wired or wireless communication with the data processing device 404 via a communication network 406.

Figure 5:
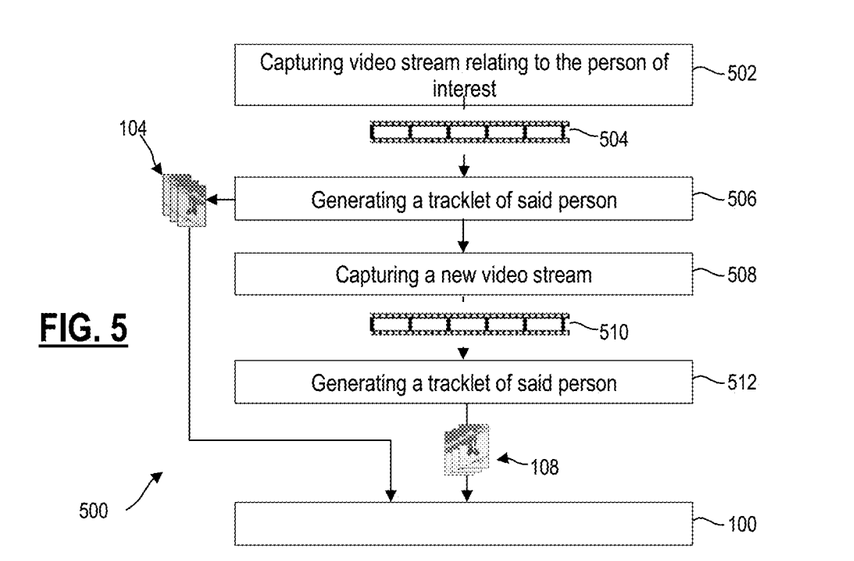
FIG. 5 is a diagrammatic representation of a non-limitative embodiment of a method for real-time monitoring of at least one person of interest according to one or more embodiments of the invention.

FIG. 5 is a diagrammatic representation of a non-limitative embodiment of a method for real-time monitoring of a person of interest according to one or more embodiments of the invention.

The method 500 in FIG. 5 can be used for real-time monitoring of at least one person of interest, by a plurality of spatially distributed cameras, such as for example the cameras $106_1$-$106_n$ in FIG. 1 or the cameras $402_1$-$402_n$ in FIG. 4.

The method 500 comprises a first step 502 during which a video stream 504, in which said person of interest appears, is captured. This video stream can be captured by any one of the spatially distributed cameras.

During a step 506, a tracklet of said person of interest is generated based on said video stream 504. This tracklet will be used as reference tracklet in the remainder of the method 500. The tracklet generated during step 506 can be stored in a database.

In particular, the tracklet generated during step 506 can be the reference tracklet 104 in FIG. 1.

Step 506 can for example be identical to step 200 in FIG. 2.

The method 500 then comprises at least one iteration of a step 508 of capture, by one of the cameras, of a new video stream 510. This new video stream 510 is captured after the video stream 504, since the method 500 makes it possible to carry out real-time monitoring of the person of interest.

During a step 512, a new tracklet is generated based on said new video stream 510. This new tracklet can optionally be stored in a database. Step 512 can be identical to step 506, and in particular be identical to step 200 in FIG. 2.

In particular, the tracklet generated during said step 512 can be the new tracklet 108 in FIG. 1.

The method 500 then comprises all the steps of the method 100 in FIG. 1 in which the tracklet of the person of interest generated in step 506 is input as reference tracklet 104 and each new tracklet generated in step 512 is input as new tracklet 108.

Steps 508, 512 and 100 can be reiterated as many times as desired, and throughout the entire period of continuous real-time monitoring of the person of interest.

Of course, the invention is not limited to the examples detailed above.

What is claimed is:

1. A method for assisting real-time monitoring of at least one person of interest, implemented by a computer, comprising:
    obtaining a reference tracklet comprising at least one sequence of images of said at least one person of interest;
    obtaining in real time a new tracklet comprising at least one new sequence of images of a new person;
    analyzing said new tracklet to determine whether said new tracklet may be associated with said at least one person of interest, comprising
        calculating a distance between a signature of said reference tracklet and a signature of said new tracklet; and
        when said distance is less than or equal to a predetermined threshold, filtering said new tracklet with at least one parameter relating to said reference tracklet; and,
    when said new tracklet may be associated with said at least one person of interest, validating whether said new tracklet is associated with said at least one person of interest.

2. The method according to claim 1, wherein said filtering said new tracklet comprises a time-space filtering of the new tracklet as a function of
    geographical positions of a camera or cameras having captured said at least one sequence of images of said at least one person of interest and said at least one new sequence of images;
    times at which said reference tracklet and said new tracklet were obtained; and,
    a predetermined maximum speed of movement of a person.

3. The method according to claim 1, wherein said filtering said new tracklet comprises a visual attribute filtering based on
    at least one color of an item of clothing of the at least one person of interest present in the reference tracklet; and,
    at least one color of an item of clothing of the new person present in the new tracklet.

4. The method according to claim 1, wherein said validating whether said new tracklet is associated with said at least one person of interest comprises one or both of
    when said new tracklet satisfies said new tracklet with a confidence level at or above a predetermined first confidence level, manual validating the new tracklet by a human operator;
    when said new tracklet satisfies said analyzing said new tracklet with a confidence level at or above a predetermined second confidence level higher than said predetermined first confidence level, automatically validating the new tracklet.

5. The method according to claim 4, further comprising
    when said manual validating the new tracklet confirms that said new tracklet is associated with said at least one person of interest, storing said new tracklet as a new reference tracklet.

6. The method according to claim 1, further comprising
    when said validating whether said new tracklet is associated with said at least one person of interest confirms that said new tracklet is associated with said at least one person of interest, storing said new tracklet.

7. The method according to claim 1, further comprising
    generating said new tracklet based on a real-time video stream supplied by a camera, wherein said generating said new tracklet comprises
        converting said real-time video stream to a plurality of images;
        detecting a set of persons in each image of said plurality of images using a first deep learning model;
        calculate a corresponding set of person signatures associated with said each image using a second deep learning model;
        extracting a sequence of images from said plurality of images that are associated with a common person, based on said corresponding set of person signatures associated with said each image of said plurality of images.

8. The method according to claim 1, further comprising
    determining the signature of said new tracklet as a function of a signature of the new person in each of the at least one new sequence of images forming said new tracklet.

9. The method according to claim 1, further comprising
    detecting at least one color of an item of clothing of the new person present in said new tracklet by using a deep learning model.

10. The method according to claim 1, wherein the distance between the signature of said reference tracklet and the signature of said new tracklet comprises a cosine distance.

11. The method according to claim 1, wherein said at least one person of interest comprises two or more persons of interest.

12. The method according to claim 1, further comprising
    capturing a reference video stream at a first time from one or more of a plurality of spatially distributed cameras, wherein said at least one person of interest is present in said reference video stream;

generating said reference tracklet based on said reference video stream;

capturing a new video stream at a second time later than said first time from one or more of said plurality of spatially distributed cameras; and, generating said new tracklet based on said new video stream.

* * * * *